Oct. 25, 1966  L. J. MARTINO  3,281,813
TEMPERATURE SENSING AND INDICATING SYSTEM
Filed April 20, 1964  2 Sheets-Sheet 1
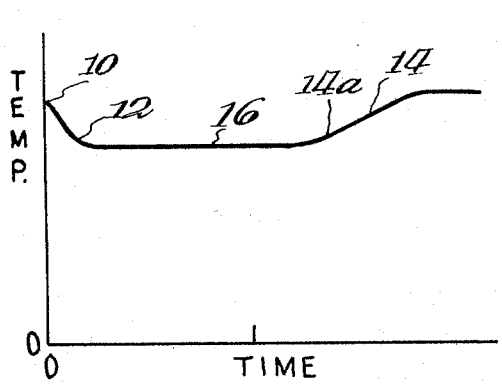
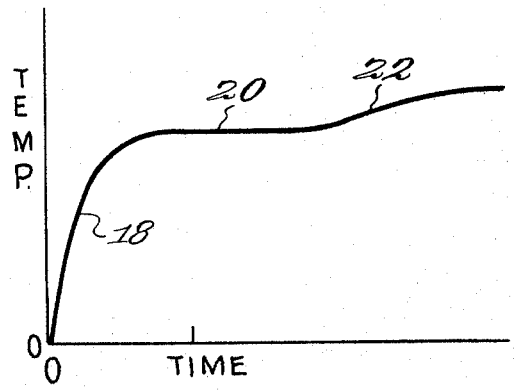
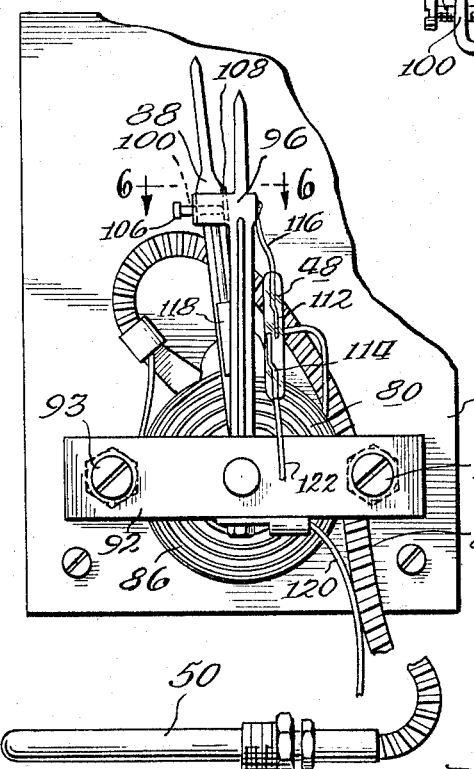
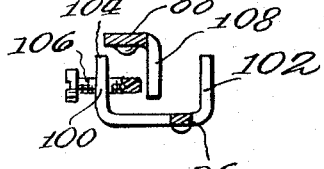
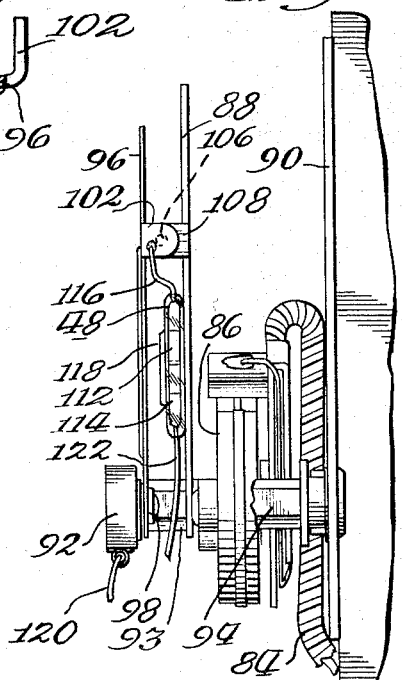
Inventor
Louis J. Martino
By Dressler, Goldsmith, Clement, Gordon & Ladd
Attorneys

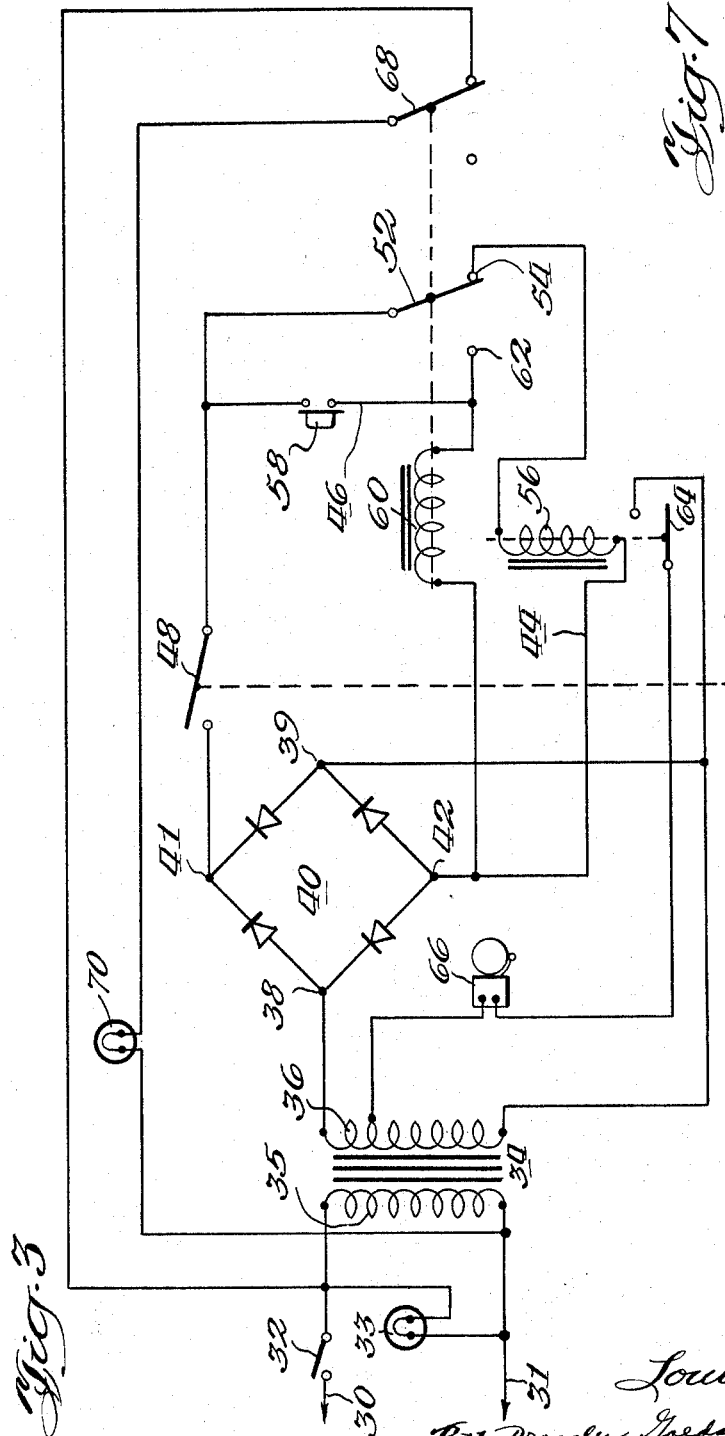

United States Patent Office 3,281,813
Patented Oct. 25, 1966

3,281,813
TEMPERATURE SENSING AND INDICATING SYSTEM
Louis J. Martino, Lombard, Ill., assignor to McDonald's System, Inc., a corporation of Illinois
Filed Apr. 20, 1964, Ser. No. 361,031
5 Claims. (Cl. 340—227)

This application is a continuation-in-part of application Serial No. 199,846, filed in the name of Louis J. Martino on June 4, 1962, now U.S. Patent No. 3,213,778.

This invention relates to an apparatus for sensing and indicating a temperature differential. More particularly, the invention concerns an apparatus which senses a predetermined temperature differential to determine a desired condition of an article, and contains an indicating device to alert the operator when the desired condition is attained.

The present invention is particularly useful in the field of cooking food products but is not limited thereto. As an illustrative embodiment however, the discussion below will primarily be related to the art of french frying or deep fat frying of food products such as potatoes or other solid pulp body vegetables.

Commercial operations such as drive-in restaurants require high production and rapid cooking techniques. To this end, potatoes are cooked in two stages. In the first stage the potatoes are pre-cooked so that product can be stored until ready for consumption. Following this, the pre-cooked potatoes merely require a relatively short finish-cooking immediately before they are served. The ultimate condition of potatoes which are fried in two stages is substantially dependent upon the pre-cooking time and temperature. Instead of using a trial and error method of pre-cooking potatoes, it is highly desirable to use a system whereby the pre-cooking or "blanching" is accomplished in a controlled manner so that a uniform result occurs independent of the various conditions which affect the precooking parameters.

It was found that when a batch of potatoes to be pre-cooked is submersed in a heated oil or other similar cooking fluid, the temperature of the oil decreases to a certain point and then remains constant for a length of time depending upon the quantity and characteristics of the potatoes. During this period, the temperature of the potatoes increases rapidly and then levels to remain substantially constant during the proper pre-cooking time. As the pre-cooking nears completion, the temperature of the heated fluid along with the potatoes begins to rise. It was discovered that when the temperature of the bath increases, the potatoes are fully and properly pre-cooked and should be removed from the bath. The pre-cooked potatoes will then only require a short re-submersion in a finish cooking bath before serving.

In the present invention there is provided an apparatus which senses the temperature increase and which automatically performs functions to atain maximum efficiency in commercial operations.

The apparatus of the present invention is able to reliably sense a predetermined and variable temperature differential and automatically signal the operator when the article is sufficiently heated.

In the present invention there is disclosed a temperature differential sensing mechanism which includes a temperature sensing device positioned in the heated bath adjacent the vegetable to be heated. The temperature differential sensing mechanism further comprises a pair of movable members operative to ascertain when a pre-determined temperature increase has occurred. The distance of separation between contacts connected to the members determines the temperature differential and, in a preferred embodiment of the invention, a means for varying said distance is provided.

A switch is furnished which is responsive to relative movement of the members, and in one form of the invention the aforementioned switch is in series with a switching circuit to thereby render the switching circuit responsive to the temperature differential sensing mechanism. An indicating device which is responsive to energization of the switching circuit is supplied whereby the operator will be signaled when the differential sensing mechanism has sensed the predetermined rise in temperature.

In a preferred form of the invention the aforementioned switch includes a pair of hermetically sealed leaf contacts connected to one of the movable members and a magnet connected to the other movable member. In this manner the leaf contacts are closed in response to close proximity of the magnet. This feature provides greater reliability and longer life to the system.

The indicating device which signals when the predetermined rise in temperature has occurred is preferably an audible device such as a buzzer so that it is not necessary for the operator to watch for the signal.

A reset circuit connected to the switching circuit is provided in one embodiment of the invention and is operable to open the switching circuit to de-energize the indicating device subsequent to energization thereof. An indicator which is responsive to the reset circuit is furnished and is adapted to be energized during the heating of the article. All of the components of the system can be placed in an attractive and convenient chassis from which the temperature sensing probe may extend.

A more detailed explanation of the invention is provided in the following description and claims and is illustrated in the accompanying drawings which disclose the principles of the invention and the best mode contemplated of applying those principles.

Although the detailed description concerns an apparatus for sensing and indicating the pre-cooking of potatoes in particular, it is to be understood that there is no intention to limit the invention with respect to the article that is heated. It is to be understood that the term "potato" and the various other terms used herein to refer to food products are intended to be generic to all products which may be treated in accordance with the apparatus of the present invention.

In the drawings:

FIGURE 1 is a graph illustrating the temperature change of the cooking bath closely adjacent the potatoes submersed therein;

FIGURE 2 is a graph showing the temperature of the potatoes and the changes in such temperature while the same are submersed in the cooking bath;

FIGURE 3 is a circuit diagram of the indicating system of the present invention showing the temperature sensing unit immersed in a cooking bath;

FIGURE 4 is a front elevation of the temperature differential sensing mechanism of the present invention;

FIGURE 5 is a side elevation of the temperature differential sensing mechanism of FIGURE 4;

FIGURE 6 is a plan view of the needles and contacts forming a portion of the temperature differential sensing device; and, FIGURE 7 is a front elevation of the chassis housing the apparatus of the present invention.

Referring to the drawings, FIGURE 1 illustrates graphically the temperature of the heated cooking bath measured adjacent the potato segments with respect to time. The particular temperatures hereinafter given are merely illustrative and are not intended to be limiting in any respect.

Prior to submersion of the potatoes the bath is heated to a temperature of approximately 280° F. indicated by reference numeral 10. When the batch of potatoes is submerged into the cooking bath the temperature of the bath decreases rapidly to approximately 245° F. as indicated by reference numeral 12. The temperature remains relatively constant for a period of time depending on the solids content and the quantity of the potatoes, following which the temperature will again rise sharply as indicated by the portion 14 of the graph.

The pre-cooking of the potatoes takes place during the relatively constant temperature interval as represented by reference numeral 16 on the graph of FIGURE 1. When the temperature begins to rise the potatoes have been properly pre-cooked and can be removed from the cooking bath, stored, and await final cooking before they are served. Properly pre-cooked potatoes require only re-submersion in a finish cooking bath having a temperature of about 325° F. for a few minutes to provide the potatoes with the desired golden color and rigid exterior.

The time-temperature curve of the potatoes is illustrated in FIGURE 2 wherein the portion of the graph represented by reference numeral 18 indicates the rapid increase in temperature of the potatoes shortly after insertion into the cooking bath. The constant portion 20 of the graph illustrated in FIGURE 2 corresponds with the interval 16 as shown in the graph of FIGURE 1. As the cooking bath temperature increases as shown by curve 14, so does the temperature of the potato as represented by the portion 22 of the curve.

The indicating circuit which signals the operator as the temperature of the bath increases as represented by portion 14 of the curve shown in FIGURE 1, is illustrated by means of a circuit diagram in FIGURE 3. The input 30–31 is connected to a suitable source of alternating current. The master on-off switch 32 is provided in the line and an on-off pilot lamp 33 is connected across the input to indicate when the switch 32 is closed and the circuit is in operation. An input transformer 34 having primary winding 35 and secondary 36 is provided in order to supply low voltage power to the indicating system.

The input 38–39 of full wave rectifier 40 is connected across the secondary winding 36 of transformer 34. Connected to the output 41–42 of bridge rectifier 40 is a pair of switching circuits designated generally as 44 and 46. Both of the switching circuits include a common switch 48 responsive to the temperature sensing device 50 which is located in the cooking bath adjacent to the zone wherein the potatoes to be cooked are submerged.

The first switching circuit 44 further includes relay arm 52 which is shown contacting a first contact 54, and a relay winding 56 is included in series with the circuit.

The second switching circuit 46 which is connected to the switching circuit 44 includes a switch 58 which is manually actuated by means of a reset button, and a relay winding 60 connected in series therewith. Relay arm 52 is responsive to energization of the relay winding 60 and a holding circuit is provided when the relay arm 52 in contacting the contact 62. In this manner the manually operated switch 58 can be released by the operator without causing de-energization of the second switching circuit 46 until switch 48 is opened.

A first indicating circuit which is connected across a portion of the secondary winding 36 of transformer 34 includes a normally opened relay arm 64 responsive to relay winding 56, and an indicator 66 in series with the relay arm. It is preferred that the indicator 66 be an audible device such as a buzzer so that it is not necessary for the operator to continually watch the operation.

The second indicating circuit is connected across the input and comprises relay arm 68 which is responsive to relay winding 60, and a cycle pilot lamp 70 connected in series therewith.

The operation of the signaling system is dependent upon the temperature differential sensing mechanism, illustrated in FIGURES 4–6. In the form of the invention illustrated in FIGURES 4–6 the temperature differential sensing mechanism generally comprises a conventional Bourdon tube movement 80 including temperature sensing probe 50, capillary tubing 84 and coil 86. An indicating pointer 88 is connected and responsive to movement of the Bourdon coil 86. An increase in temperature sensed by probe 50 thereby causes clockwise movement of the indicating pointer 88. The movement is connected to the back plate 90 by any suitable fastening means. A support member 92 is provided adjacent to the Bourdon mechanism and is extended from the back plate 90 by connecting bolts 93 and 94. The support member 92 is preferably composed of a nonconducting substance such as Bakelite or any other insulating material.

An alarm pointer 96 is pivotally connected to support member 92 by means of a suitable screw and washer pivot such as indicated at 98. The pivot 98 supplies enough tension so that the alarm pointer 96 cannot move unless an external force is applied thereto.

Connected to or formed integral with alarm pointer 96 are contact members 100 and 102 which are most clearly shown in FIGURE 6. The contact member 100 comprises an extending flange 104 having an aperture therein which threadingly receives bolt 106. The bolt 106 is composed of an insulating material such as nylon or any other suitable material. The contact member 102 comprises an extending flange which is spaced a predetermined distance from contact member 100 in accordance with the length of the bolt which extends between flanges 102 and 104.

A flange 108 which extends toward the alarm pointer 96 is connected to or formed integral with indicating pointer 88. The extending flange 108 enables the indicating pointer 88 to carry the alarm pointer 96 during substantial movement of the former.

Although flanges 108 and 102 could form the contacts of a switch, in a preferred embodiment of the invention a hermetically sealed magnetic reed switch 48 is used in order to provide longer life and greater reliability. As shown most clearly in FIGURES 4 and 5 the magnetic reed switch includes a pair of cantilever-type reeds 112 and 114 which are hermetically sealed to prevent contact destruction. The upper reed 112 is connected by a lead 116 to the alarm pointer 96 by means of solder or other suitable connecting means. A magnet 118 which preferably takes the general form of a rectangular parallelepiped is affixed to indicating pointer 88 by a suitable connecting means such as solder.

A lead 120 is connected to the alarm pointer 96 and is extended into the signal circuit with lead 122 which is connected to the lower reed 114 of the magnetic reed switch.

In the operation of the device, as the cooking bath is heated indicating pointer 88 moves in a clockwise direction. When flange 108 engages the flange 102 the alarm pointer 96 is carried in a clockwise direction by the force of the indicating pointer 88. When flanges 108 and 102 are substantially in contact, the close proximity of the magnet 118 to the reeds 112 and 114 causes the upper reed 112 to engage the lower reed 114 to thereby close the switch 48.

Once the temperature of the cooking bath has reached its desired point the batch of potatoes is submersed therein by the operator, causing the temperature of the bath closely adjacent the potatoes to decrease as indicated in the portion 12 of the curve illustrated in FIGURE 1. The decrease in temperature causes the indicating pointer 88 to move in a counter-clockwise direction. The flange 108 becomes spaced from flange 102 and the reeds 112, 114 disengage. There is no contact between the contact members of the alarm pointer 96 and the flange 108 until the temperature decreases to a point wherein the flange 108 contacts the tip of bolt 106. If the temperature continues to decrease the alarm pointer 96 will be carried by the flange 108 in a counter-clockwise direction, and the distance between flange 108 and the flange 102 will be determined by the position of the bolt 106. It is seen that the distance between the tip of the bolt 106 and the flange 102 determines the temperature differential which will be sensed by the instrument.

During the constant temperature portion of the cycle as indicated in FIGURE 1 by portion 16 of the curve, the flange 108 and the flange 102 will be substantially spaced and will take the position as illustrated in FIGURE 4. When the probe 50 senses a temperature rise as depicted by portion 14 of the curve of graph 1, indicating pointer 88 and its extending flange 108 will, through the action of the Bourdon tube, move in the clockwise direction and upon 108 coming into close proximity with flange 102, the reed switch 48 will close due to the close proximity of the magnet 118.

If the operator desires to have the reed switch closed as soon as the temperature begins to rise (as represented by the lower part 14a of curved portion 14 in FIGURE 1) the bolt 106 can be rotated so that the distance between its tip and the flange 102 is at a minimum. On the other hand, if it is not desired to have the reed switch closed until the temperature increase has become more substantial, the bolt 106 is rotated so that its tip is at a maximum distance from the flange 102.

Referring to FIGURE 3 the operation of the signal circuit with respect to the temperature differential sensing mechanism illustrated in FIGURES 4–6 is as follows:

The off-on switch 32 is closed and the potatoes are submerged into the cooking bath. After the pre-cooking is completed and the temperature begins to rise, the reed switch 48 is closed to thereby energize relay winding 56. This cause actuation of relay arm 64 to thereby complete the indicating circuit and indicator 66 will be energized. The potatoes are removed from the bath and the switch 58 is closed by manually pressing a reset button. When the switch 58 is closed, relay winding 60 is energized causing relay arm 52 to engage the contact 62 and causing relay arm 68 to open the cycle pilot circuit. This de-energizes relay winding 56 thereby causing the signal from indicator 66 to cease. Although the reset button 58 is released, a holding circuit is formed by the relay arm 52 engaging contact 62 until the reed switch 48 is opened due to the insertion of another batch of potatoes into the cooking bath.

If the holding circuit was not provided, the opening of switch 58 would cause relay winding 60 to be de-energized thereby allowing relay arm 52 to engage contact 54. If no potatoes were submersed in the cooking bath the reed switch 48 would remain closed and the relay winding 56 would become energized to thereby cause indicator 66 to emit a signal at an improper time.

When a new batch of potatoes is submerged into the cooking bath, the indicating pointer 88 moves in a counter-clockwise direction thereby causing reed switch 48 to open and the relay winding 60 is de-energized. The relay arm 52 which is responsive to relay winding 60 engages contact 54 and relay arm 68 closes the cooking pilot circuit to cause pilot lamp 70 to go on thereby indicating that the pre-cooking stage of the operation is in process. Again, when the temperature of the bath adjacent the potates increases, reed switch 48 closes causing indicator 66 to emit a signal, thereby repeating the cycle.

It is evident that the sensing and signaling system of the present invention provides a completely automatic operation wherein the operator can determine the stage of operation by observing the cooking pilot lamp, and will be signaled when an increase in temperature of the cooking bath is occasioned. There is further provided a reliable sensing mechanism which can be adjusted to a predetermined temperature differential response.

The embodiment of the signal circuit shown in FIGURE 3 includes D.C. relays. However, it is to be understood that the invention is not limited to the use of direct current relays.

The complete system can be housed in an attractive chassis such as depicted in FIGURE 7 wherein a housing 130 is illustrated containing the components of the system. The housing 130 can be placed near the cooking bath with the tubing 84 extending thereto, for an efficient operation.

The invention has been described as applied to a preferred embodiment, and it will be understood that various substitutions and changes may be effected without departing from the spirit and scope of the novel concepts and principles of this invention.

What is claimed is:

1. Cooking apparatus for the cooking of a product comprising a cooking tank adapted to contain a heated cooking liquid, a cooking basket adapted to contain a product to be cooked and adapted to be immersed in said heated cooking liquid, a temperature sensing probe adjacent said cooking basket for sensing the temperature of said heated cooking liquid adjacent said cooking basket, means coupled to said temperature sensing probe for sensing an unpredetermined low temperature condition sensed by said temperature sensing probe adjacent said cooking basket and for indicating a predetermined temperature rise from said unpredetermined low temperature condition.

2. Cooking apparatus as described in claim 1, wherein said coupled means includes a first movable member operative in response to said temperature sensing probe whereby a temperature increase causes first directional movement and a temperature decrease causes second directional movement, a second movable member adjacent said first movable member, said second movable member including first engagement means positioned for engagement with said first movable member during said first directional movement thereof and second engagement means positioned for contact with said first movable member during said second directional movement thereof, said first and second engagement means being separated by a predeterminable distance, said second movable member being movable in response to movement of said first movable member while said first movable member is in engagement with said second engagement means, and means responsive to contact between said first movable member and said first engagement means to indicate said predetermined temperature rise.

3. Means for the controlled cooking of a product during a cooking cycle comprising a cooking tank adapted to contain a heated cooking liquid, basket means adapted to contain a product to be cooked in said cooking tank, the immersion of a product to be cooked in said cooking tank causing a decrease in the temperature adjacent said basket means during a cooking cycle to an unpredetermined low temperature condition, temperature sensing means in said cooking tank for sensing the temperature and said condition in the liquid adjacent said basket means, means including signalling means responsive to said temperature sensing means for indicating a predetermined temperature rise above said temperature condition to indicate the completion of a cooking cycle, and switch means for said signalling means for permitting and preventing operation of said signalling means.

4. A temperature differential sensing mechanism comprising: temperature sensing means, a first movable member operative in response to said temperature sensing means whereby a temperature increase causes first directional movement and a temperature decrease causes second directional movement, a second movable member adjacent said first movable member, first engagement means connected to said second movable member and positioned for contact with said first movable member during said first directional movement thereof, second engagement means connected to said second movable member and positioned for contact with said first movable member during said second directional movement thereof, said first and second engagement means being separated by a distance representing a predetermined temperature differential, said second movable member being movable in response to movement of said first movable member while said first movable member is in contact with said second engagement means, and switch means responsive to contact between said first movable member and said first engagement means, said switch means being adapted for connection to an indicating circuit.

5. A temperature differential sensing mechanism as described in claim 4, including means for varying the distance between said first and second engagement means whereby the temperature differential to be sensed is varied.

References Cited by the Examiner

UNITED STATES PATENTS

| | | |
|---|---|---|
| 2,240,847 | 5/1941 | Hildebrecht. |
| 2,715,165 | 8/1955 | Matter et al. 340—266 X |
| 2,741,099 | 4/1956 | Beane 340—227 X |
| 2,923,786 | 2/1960 | Jones 200—56 |
| 2,973,414 | 2/1961 | Bossemeyer 340—266 X |
| 3,188,618 | 6/1965 | Rentz 340—222 X |
| 3,193,198 | 7/1965 | Carlson. |
| 2,213,778 | 10/1965 | Martino 340—222 X |

FOREIGN PATENTS 317,156  4/1934  Italy.

NEIL C. READ, *Primary Examiner.*

D. YUSKO, *Assistant Examiner.*